(12) United States Patent
Winder et al.

(10) Patent No.: US 7,970,226 B2
(45) Date of Patent: Jun. 28, 2011

(54) LOCAL IMAGE DESCRIPTORS

(75) Inventors: Simon Winder, Seattle, WA (US);
Matthew Brown, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1041 days.

(21) Appl. No.: 11/738,875

(22) Filed: Apr. 23, 2007

(65) Prior Publication Data
US 2008/0260274 A1  Oct. 23, 2008

(51) Int. Cl.
*G06K 9/40* (2006.01)

(52) U.S. Cl. ........ 382/254; 382/103; 382/141; 434/262; 345/418

(58) Field of Classification Search .................. 382/103, 382/154, 190, 195, 218, 141, 239, 278
See application file for complete search history.

(56) References Cited

U.S. PATENT DOCUMENTS

| | | | |
|---|---|---|---|
| 5,166,876 A * | 11/1992 | Cline et al. ..................... | 345/424 |
| 5,283,837 A * | 2/1994 | Wood ............................. | 382/285 |
| 6,055,334 A | 4/2000 | Kato | |
| 6,157,737 A | 12/2000 | Ishikawa et al. | |
| 6,331,116 B1 * | 12/2001 | Kaufman et al. ............... | 434/262 |
| 6,343,150 B1 | 1/2002 | Darrell et al. | |
| 6,514,082 B2 * | 2/2003 | Kaufman et al. ............... | 434/262 |
| 6,687,416 B2 | 2/2004 | Wang | |
| 6,941,022 B2 | 9/2005 | Shibata et al. | |
| 7,076,093 B2 | 7/2006 | Lee et al. | |
| 7,139,421 B1 | 11/2006 | Fix et al. | |
| 7,574,019 B2 * | 8/2009 | Mittal et al. ................... | 382/103 |
| 2003/0058237 A1 * | 3/2003 | Lee ............................... | 345/418 |
| 2003/0107678 A1 | 6/2003 | Lin et al. | |
| 2003/0108242 A1 | 6/2003 | Concant | |
| 2005/0048456 A1 | 3/2005 | Chefd'hotel et al. | |
| 2005/0238198 A1 | 10/2005 | Brown et al. | |
| 2005/0286757 A1 | 12/2005 | Zitnick et al. | |
| 2005/0286767 A1 | 12/2005 | Hager et al. | |
| 2006/0002609 A1 | 1/2006 | Casadei | |
| 2006/0083429 A1 | 4/2006 | Joly | |
| 2006/0257028 A1 | 11/2006 | Laurent et al. | |
| 2010/0142805 A1 * | 6/2010 | Maxwell et al. ............... | 382/164 |

OTHER PUBLICATIONS

Belongie, S., J. Malik, and J. Puzicha, Shape matching and object recognition using shape context, IEEE Trans. on Pattern Analysis of Machine Intelligence, 2002, pp. 509-522, vol. 24.
Brown, M., R. Szeliski, and S. Winder, Multi-image matching using multi-scale oriented patches, Proc. IEEE Conf. on Computer Vision and Pattern Recognition, 2003, pp. 510-517, vol. 1.
Carneiro, G., and A. D. Jepson, Multi-scale phase-based local features, Proc. IEEE Conf. on Computer Vision and Pattern Recognition, 2003, pp. 736-743, vol. 1.

(Continued)

*Primary Examiner* — Wesley Tucker
*Assistant Examiner* — Aklilu K Woldemariam
(74) *Attorney, Agent, or Firm* — Lyon & Harr, LLP; Richard T. Lyon (57) ABSTRACT

A local image descriptor generation technique that produces a descriptor for an image patch is presented. The technique generally involves smoothing the pixels of the image patch, followed by employing a transformation to produce a transform vector for each of a set of sample points spaced across the image patch. The transform vectors are weighted and spatially accumulated to produce a prescribed number of linearly summed vectors. The linearly summed vectors are concatenated to form a raw local image descriptor, which is normalized to produce a finalized descriptor for the image patch.

20 Claims, 9 Drawing Sheets

OTHER PUBLICATIONS

Fischler, M. A., R. C. Bolles, Random sample consensus: A paradigm for model fitting with applications to image analysis and automated cartography, Comm. of the ACM, 1981, pp. 381-395, vol. 24.

Freeman, W. T., and E. H. Adelson, The design and use of steerable filters, IEEE Transactions on Pattern Analysis and Machine Intelligence, Sep. 1991, pp. 891-906, vol. 13, No. 9.

Lazebnik, S., C. Schmid, J. Ponce, Sparse texture representation using affine-invariant neighborhoods, Proc. of the Conf. on Computer Vision and Pattern Recognition, 2003, vol. 2, pp. 319-324, Madison, Wisconsin, USA.

Lowe, D., Object recognition from local scale-invariant features, IEEE Int'l, Conf. on Computer Vision, Sep. 1999, pp. 1150-1157, Kerkyra, Corfu, Greece.

Lowe, D., Distinctive image features from scale invariant keypoints, Int. J. of Computer Vision, 2004, pp. 91-110, vol. 60, No. 2.

Mikolajczyk, K., C. Schmid, Indexing based on scale invariant interest points, Proc. 8th Int'l. Conf. Comput. Vis., 2001, pp. 525-531, Vancouver, Canada.

Mikolajczyk, K., and C. Schmid, A performance evaluation of local descriptors, Proc. IEEE Conf. on Computer Vision and Pattern Recognition, 2003, pp. 257-263, Madison, Wisconsin.

Nistér, D., and H. Stewénius, Scalable recognition with a vocabulary tree, IEEE Conf. on Computer Vision and Pattern Recognition, Jun. 2006, pp. 2161-2168, vol. 2.

Qin, L., Zeng, W., Gao, W., Wang, W., Local invariant descriptor for image matching, IEEE Int'l Conf. on Acoustics, Speech, and Signal Processing, Mar. 18-23, 2005, (ICASSP '05), vol. 2, pp. 1025-1028, Inst. of Comput. Technol., Chinese Acad. of Sci., Beijing, China.

Randen, T. And J.H. Husøy, Filtering for texture classification: A comparative study, IEEE Transactions on Pattern Analysis and Machine Intelligence, 1999, pp. 291-310, vol. 21, No. 4.

Se, S., D. Lowe, and J. Little, Global localization using distinctive visual features, Proceedings of the IEEE/RSJ Conf. on Intelligent Robots and Systems (IROS), Oct. 2002, pp. 226-231, Lausanne, Switzerland.

Snavely, N., S. M. Seitz, R. Szeliski, Photo tourism: Exploring photo collections in 3D, ACM Transactions on Graphics (SIGGRAPH Proceedings), 2006, pp. 835-846, vol. 25, No. 3.

White, R., Newsam, S., Kamath, C., Matching shapes using local descriptors, Lawrence Livermore National Laboratory, UCRL-TR-206057, Aug. 2004.

Faille, F., Adapting interest point detection to illumination conditions, Proc. VIIth Digital Image Computing: Techniques and Applications, Sun C., Talbot H., Ourselin S. and Adriaansen T. (Eds.), Dec. 10-12, 2003, Sydney.

Islam S., A. Sluzek, Z. Lin, M. Joo, Towards invariant interest point detection of an object, Proceedings of the 13th Int'l Conf, in Central Europe on Computer Graphics, Visualization and Computer Vision, pp. 101-104, Jan. 31-Feb. 4, 2005.

Mikolajczyk, K., and C. Schmid, An affine invariant interest point detector, Proc. European Conf. Comp. Vision, 2002, vol. I, pp. 128-142, Copenhagen, Denmark.

Laptev, I., and T. Lindeberg, Interest point detection and scale selection in space-time, Lecture Notes in Computer Science, 2003, vol. 2695, pp. 372-387, L.D. Griffin and M Lillholm, ed., Scale-Space03, Springer Verlag, Berlin, pp. 372-387.

Nistér, D., and H. Stewénius, Scalable recognition with a vocabulary tree, IEEE Conf. on Computer Vision and Pattern Recognition, Jun. 2006, pp. 2151-2168, vol. 2.

Pollefeys, M., and L. V. Gool, From images to 3D models, Communications of the ACM, Jul. 2002, pp. 50-55, vol. 45, No. 7.

Randen, T. and J.H. Husøy, Filtering for texture classifiction: A comparative study, IEEE Transactions on Pattern Analysis and Machine Intelligence, 1999, pp. 291-310, vol. 21, No. 4.

Snavely, N., S. M. Seitz, R. Szeliski, Photo tourism; Exploring photo collections in 3D, ACM Transactions on Graphics (SIGGRAPH Proceedings), 2006, pp. 835-846, vol. 25, No. 3.

* cited by examiner

|  | Pooling Pt Distances | Weight Function Sizes |
|---|---|---|
| 3 x 3 | 7.9, 12.7 | 1.84, 3.2, 4.7 |
| 4 x 4 | 2.5, 10.3, 18.0 | 1.79, 3.37, 4.81 |
| 5 x 5 | 2.8, 3.3, 9.2, 12.7, 20.5 | 4.9, 1.2, 2.3, 3.0, 3.6, 4.7 |

FIG. 7

|  | Pooling Pt Ring Radii | Ring Rotation Angles | Weight Function Sizes |
|---|---|---|---|
| 2-Ring | 6.7, 15.0 | 4.6° (inner) | 1.6, 2.6, 4.4 |
| 3-Ring | 5.7, 12.4, 17.1 | 13.7° (inner), -32.5° (middle) | 1.6, 2.4, 3.4, 6.03 |

LOCAL IMAGE DESCRIPTORS

BACKGROUND

Interest point detectors and descriptors are used to obtain image to image correspondence for 3D reconstruction, searching databases of photographs and as a first stage in object or place recognition, among other things. In a typical scenario, an interest point detector is used to select matchable points in an image and a descriptor is used to characterize the region around each interest point typically referred to as an image patch. The output of a descriptor algorithm is a short vector of numbers which is invariant to common image transformations and can be compared with other descriptors in a database to obtain matches according to a distance metric. Many such matches can be used to bring images into correspondence or as part of a scheme for location recognition.

SUMMARY

This Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

The present local image descriptor generation technique produces a local image descriptor for an image patch. The technique generally involves first smoothing the pixels values of the image patch. A transformation is employed to produce a transform vector for each of a set of sample points spaced across the image patch. Each of these transform vectors has a prescribed number of elements and numerically represents the smoothed values of a pixel or pixels in the vicinity of the sample point associated with the transform vector. The transform vectors are then weighted and spatially accumulated to produce a prescribed number of linearly summed vectors. The transform vectors used to produce each linearly summed vector are associated with the sample points found within a local pooling region centered on a pooling point, which is part of a pattern of pooling points located across the image patch. The transform vectors in each pooling region are weighted using a normalized Gaussian weighting function associated with that region. The weighted transform vectors associated with each pooling region are linearly summed to produce a linearly summed vector for each respective region. The linearly summed vectors are next concatenated to form a raw local image descriptor. The raw descriptor is then normalized to produce a finalized local image descriptor for the image patch.

DESCRIPTION OF THE DRAWINGS

The specific features, aspects, and advantages of the present invention will become better understood with regard to the following description, appended claims, and accompanying drawings where:

DETAILED DESCRIPTION

In the following description of embodiments of the present invention reference is made to the accompanying drawings which form a part hereof, and in which are shown, by way of illustration, specific embodiments in which the invention may be practiced. It is understood that other embodiments may be utilized and structural changes may be made without departing from the scope of the present invention.

1.0 The Computing Environment

Before providing a description of embodiments of the present local image descriptor generation technique, a brief, general description of a suitable computing environment in which portions thereof may be implemented will be described. The present technique is operational with numerous general purpose or special purpose computing system environments or configurations. Examples of well known computing systems, environments, and/or configurations that may be suitable include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 1:
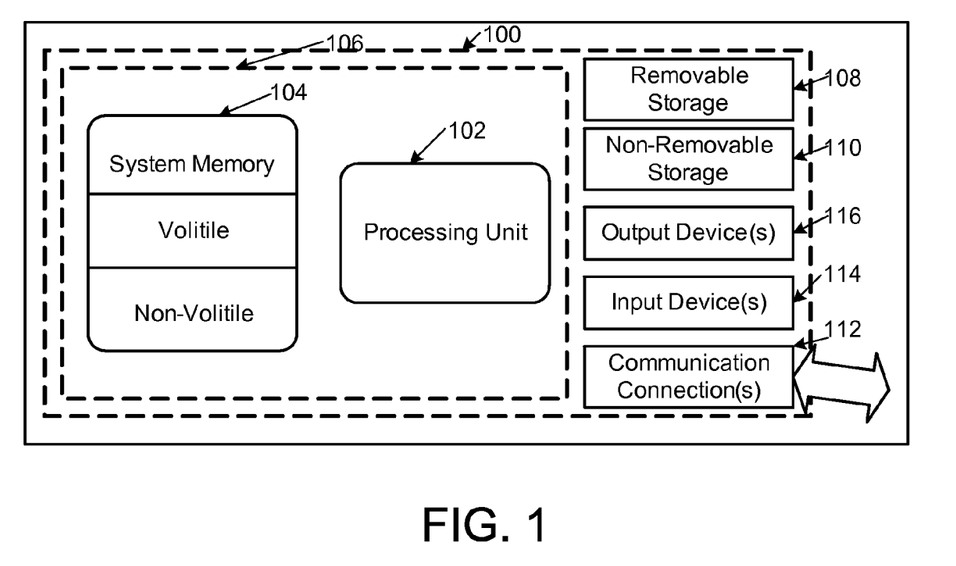
FIG. 1 is a diagram depicting a general purpose computing device constituting an exemplary system for implementing the present invention.

FIG. 1 illustrates an example of a suitable computing system environment. The computing system environment is only one example of a suitable computing environment and is not intended to suggest any limitation as to the scope of use or functionality of the present technique. Neither should the computing environment be interpreted as having any dependency or requirement relating to any one or combination of components illustrated in the exemplary operating environment. With reference to FIG. 1, an exemplary system for implementing the present technique includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, device 100 may also have additional features/functionality For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 may also contain communications connection(s) 112 that allow the device to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 100 may also have input device(s) 114 such as keyboard, mouse, pen, voice input device, touch input device, camera, etc. Output device(s) 116 such as a display, speakers, printer, etc. may also be included. All these devices are well know in the art and need not be discussed at length here.

The present local image descriptor generation technique may be described in the general context of computer-executable instructions, such as program modules, being executed by a computing device. Generally, program modules include routines, programs, objects, components, data structures, etc. that perform particular tasks or implement particular abstract data types. The present technique may also be practiced in distributed computing environments where tasks are performed by remote processing devices that are linked through a communications network. In a distributed computing environment, program modules may be located in both local and remote computer storage media including memory storage devices.

The exemplary operating environment having now been discussed, the remaining parts of this description section will be devoted to a description of the program modules embodying the present technique.

2.0 Local Image Descriptors

The input to the present technique for generating local image descriptors is a square image patch while the output is a vector of numbers representing the descriptor. This descriptor is intended to be descriptive of the image patch such that comparing descriptors should allow for a determination of whether two patches are views of the same 3D point. In addition, the descriptor should be tolerant to variations in common image characteristics such as lighting, exposure, noise, and so on.

2.1 Image Patch Preparation

While, the descriptors generated using the present technique will be tolerant of variation in the aforementioned common image characteristics, the situation may be different for variations in rotation and scale. When comparing descriptors generated for a pair of image patches from different images but depicting the same 3D point, matching the descriptors could be adversely affected by differences in the rotation of the scene appearing in the respective image patches, as well as the respective scale of the scene in the two patches.

In view of the rotation and scale issue, each image patch that a descriptor is to be generated for, is first normalized as to its scale and rotation to match a canonical scale and rotation. One way of accomplishing the rotation normalization task is to use a gradient approach. This approach involves computing a local reference direction associated with a prescribed point in the patch (such as the interest point of the patch) using a standard gradient analysis of the image patch pixels. The patch is then rotated about the prescribed point so that its local reference direction matches a prescribed canonical direction, prior to computing its local image descriptor. In this way, if an image patch depicts the same 3D point as another patch, but rotated, both patches would be rotationally brought into sync prior to generating descriptors. As such the descriptor should match more closely than they might if the descriptors were computed with the patches in their original condition.

Similarly, conventional procedures are employed to determine the scale of each image patch, and to adjust it to match a prescribed canonical scale, prior to being processed using the present local image descriptor generation technique. In this way, the patches will have matching scales and so a pair of patches depicting the same 3D point should match more closely than they might if the descriptors were computed with the patches at their original scales.

2.2 Local Image Descriptor Generation

Figure 2:
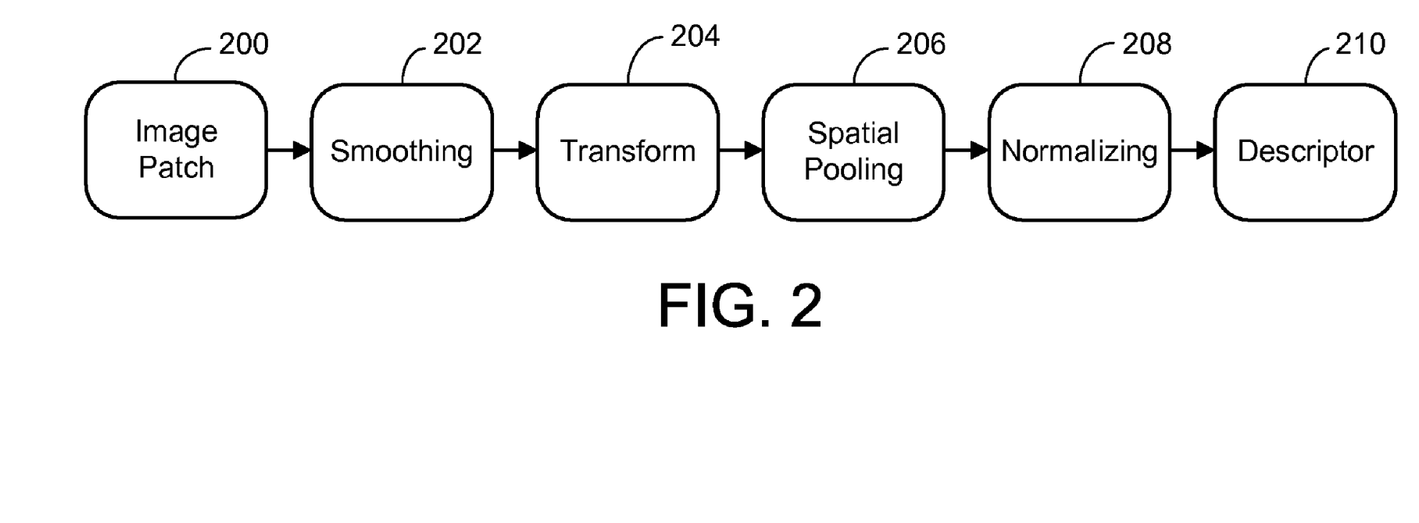
FIG. 2 is a block diagram showing the general stages involved in generating a local image descriptor from an image patch.

The present technique for generating a local image descriptor for an image patch generally involves four stages, as shown in FIG. 2. The first stage 202 involves smoothing the image patch, the second stage 204 involves the use of a transformation, the third stage 206 involves spatial pooling, and the final stage 208 involves normalization. The input to the descriptor generation technique is an image patch 200 and the final output is a local image descriptor 210 in the form of a vector of numbers. In tested embodiments, a 64×64 pixel image patch was used as the input, and the output was a vector of size kN. As will be described in the sections to follow, k refers to the size of a transform vector computed in the transform phase for each of a set of sample points, and N refers to the number of linearly summed vectors that are produced by spatially accumulating weighted transform vectors around each of a group of pooling points.

Each of the aforementioned stages will now be described in turn. It is noted that for the transformation and spatial spooling phases, more than one technique can be used. Examples of alternate techniques that can be employed for these two phases will be described as well.

2.2.1 Smoothing

The pixels of the image patch are first smoothed before any other processing takes place. In one embodiment of the present technique, the smoothing is accomplished using a Gaussian kernel of standard deviation $\sigma_{smoothing}$. Tested embodiments employed a $\sigma_{smoothing}$ between about 0.5 and about 3.0.

The smoothing makes the present technique less sensitive to noise in the interest point location associated with the image patch. Typically, the degree of the smoothing is made greater in direct proportion to the amount of noise. The smoothing also reduces aliasing in the subsequent steps of the present technique. Finally, as will be described shortly, the value of $\sigma_{smoothing}$ establishes a scale for transformations involving a Difference of Gaussian (DoG) approach.

2.2.2 Transformation

The transformation phase generally maps the smoothed input patch onto a grid with one length k vector having positive elements for each output sample. In tested embodiments of this transformation, the output grid was given the same resolution as the input patch, although this need not be the case.

While any conventional transformation technique could be employed for this phase, three types were found to produce good results. A good result was measured as a low rate of false matches when 95 percent of all correct matches are detected using the local image descriptor produced by the present technique. Each of these three transformation techniques will now be described.

2.2.2.1 Gradient Vector Transformations

The gradient vector transformation generally involves evaluating the gradient $\nabla$ at each of a set of sample points in the image patch and rectifying the x and y components to produce a vector of length 4:

$$\{|\nabla_x|-\nabla_x;\ |\nabla_x|+\nabla_x;\ |\nabla_y|-\nabla_y;\ |\nabla_y|+\nabla_y\}.$$

This vector represents a natural sine-weighted quantization of orientation into 4 directions.

In an alternate embodiment of the gradient vector transformation approach the rectified gradient vector is extended to eight positive elements by concatenating the original four direction gradient vector with an additional four element gradient vector representing a 45 degree rotation of the original vector:

$$\{|\nabla_x|-\nabla_x;\ |\nabla_x|+\nabla_x;\ |\nabla_y|-\nabla_y;\ |\nabla_y|+\nabla_y;\ |\nabla_{45_x}|-\nabla_{45_x};$$
$$|\nabla_{45_x}|+\nabla_{45_x};\ |\nabla_{45_y}|-\nabla_{45_y};\ |\nabla_{45_y}|+\nabla_{45_y}\}$$

2.2.2.2 Steerable Filter Transformations

The steerable filter transformation generally involves applying steerable filters at each of a set of sample points in the image patch using d orientations to produce d quadrature response pairs for each point. The odd and even components of each quadrature response pair are rectified to produce 4 elements, respectively:

$$\{|even|-even;\ |even|+even;\ |odd|-odd;\ |odd|+odd\}.$$

These are then concatenated and in this way, a rectified quadrature response pair vector is created for each sample point having k=4d positive vector elements.

For example, if steerable filters representing 4 orientations (i.e., d=4) are employed in the transformation, this produces 4 odd-even quadrature response pairs. Each pair is then rectified as shown above to produce 4 elements. These elements are then combined to produce the rectified quadrature response pair vector having k=4×4=16 elements.

It was found that two kinds of steerable filters produced acceptable results—namely, those based on second derivatives provide broad orientation tuning, while fourth order filters give narrow orientation tuning that can discriminate multiple orientations at each location in the input patch.

2.2.2.3 Difference of Gaussians Transformations

Figure 3:
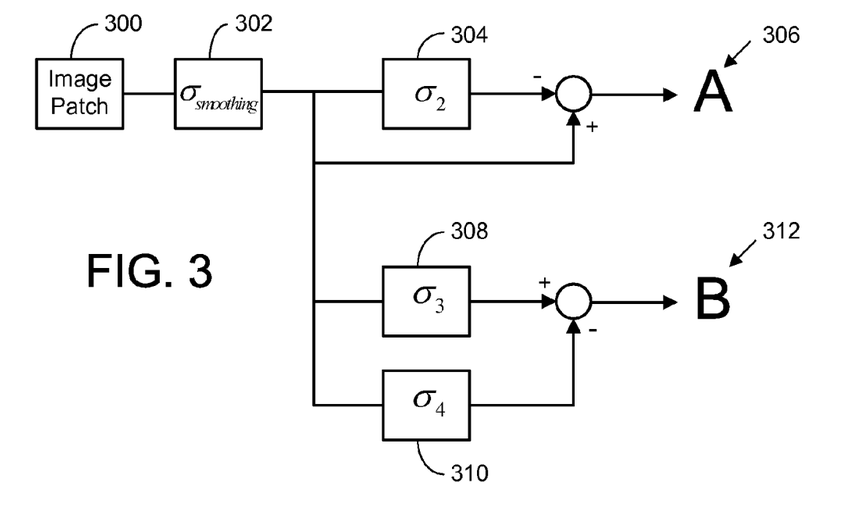
FIG. 3 is a block diagram depicting one embodiment of how two linear DoG filter outputs A and B are produced by convolving the image patch with combinations of four different Gaussians.

The Difference of Gaussians (DoG) transformation generally involves computing two isotropic DoG responses with different center scales at each of a set of sample points in the image patch. More particularly, the previously smoothed image patch is convolved with three Gaussians (a second center and two surrounds). The result of this procedure is two linear DoG filter outputs A and B. FIG. 3 illustrates how these outputs are obtained. The image patch 300 is convolved with the previously discussed smoothing Gaussian filter 302 having the standard deviation $\sigma_{smoothing}$. The smoothed image patch is then convolved with the first of the two surround Gaussian filters 304. The standard deviation of this filter is designated as $\sigma_2$. The negative of the result of the second convolution is combined with the smoothed image patch, as shown in FIG. 3, to produce the output A 306. Additionally, the smoothed image patch is convolved with second center Gaussian filter 308 (having a standard deviation designated as $\sigma_3$), and separately with the second of the two surround Gaussian filters 310 (having a standard deviation designated as $\sigma_4$). The negative of the results of the convolution with the second surround filter 310 is combined with the result of the convolution with the second center filter 308, as shown in FIG. 3, to produce the output B 312.

In view of the foregoing, it is evident that the Gaussian filter used to smooth the image patch sets the size of the first DoG center (i.e., $\sigma_1$). The size of the second DoG center is set to have a prescribed standard deviation value. In tested embodiments, the prescribed standard deviation value of the second DoG center was set at around four times that of $\sigma_1$. Thus, the effective size of the first DoG surround, which is associated with the first DoG center, is given by $\sqrt{\sigma_1^2+\sigma_2^2}$. The effective size of the second DoG center is given by $\sqrt{\sigma_1^2+\sigma_3^2}$. And finally, the effective size of the second DoG surround, which is associated with the second DoG center, is given by $\sqrt{\sigma_1^2+\sigma_4^2}$.

It is noted that the ratio of the effective size of each DoG surround to the effective size of its associated DoG center, is set to a prescribed value R. Thus, given the standard deviation of the first and second DoG centers, the standard deviations of the two DoG surrounds can be computed as follows:

$$\sigma_2: \frac{\sqrt{\sigma_1^2+\sigma_2^2}}{\sigma_1} = R \text{ so } \sigma_2 = \sqrt{(R\sigma_1)^2 - \sigma_1^2}$$

$$\sigma_4: \frac{\sqrt{\sigma_1^2+\sigma_4^2}}{\sqrt{\sigma_1^2+\sigma_3^2}} = R \text{ so } \sigma_4 = \sqrt{R^2\sigma_1^2 + R^2\sigma_3^2 - \sigma_1^2}$$

In tested embodiments, the prescribed ratio was set to 1.4.

The two linear DoG filter outputs A and B are then used to generate a length k=4 DoG vector for each sample point by rectifying the responses as follows:

$$\{|A|-A;\ |A|+A;\ |B|-B;\ |B|+B\}$$

2.2.3 Spatial Pooling

In the spatial pooling stage, vectors generated in the transformation stage are weighted and spatially accumulate to produce N linearly summed vectors of length k. These summed vectors are concatenated to form a descriptor of kN dimensions. In tested embodiments of the present technique, $N \in \{3, 9, 16, 17, 25\}$.

It was found that a particular type of spatial pooling produced the desired good results, especially if combined with one of the foregoing transformation techniques. More particularly, in the aforementioned type of spatial pooling, each linearly summed vector is computed by summing the transform vectors associated with sample points found within a local pooling region. Each local pooling region is centered on a pooling point, which is part of a pattern of pooling points located across the image patch. In addition, each transform vector used to produce a linearly summed vector is weighted prior to the summing using a normalized Gaussian weighting function associated with the local pooling region.

The different spatial arrangements of the pooling points, and the weighting technique will now be described in the sections to follow. However, it should be noted that the following pooling point arrangements are not intended to be viewed as the only arrangements within the scope of the present technique. To the contrary, other arrangements are possible and can be employed in the present technique as desired.

2.2.3.1 An n×n Array of Pooling Points

In this embodiment of the spatial pooling stage, the aforementioned normalized Gaussian weighting functions are used to sum transformation vectors over local pooling regions arranged in an n×n array. For example, in tested embodiments, 3×3, 4×4 and 5×5 arrays of pooling points were employed with success.

Figure 4:
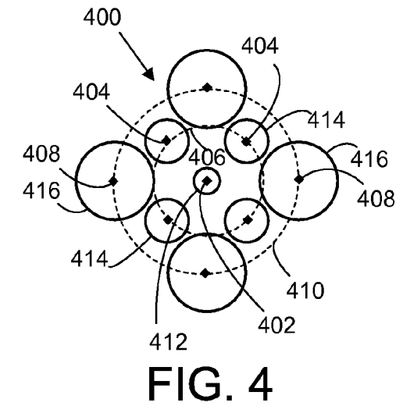
FIG. 4 is a diagram illustrating one embodiment of a pooling point pattern for a 3×3 array, including the local pooling regions surrounding each point.
Figure 5:
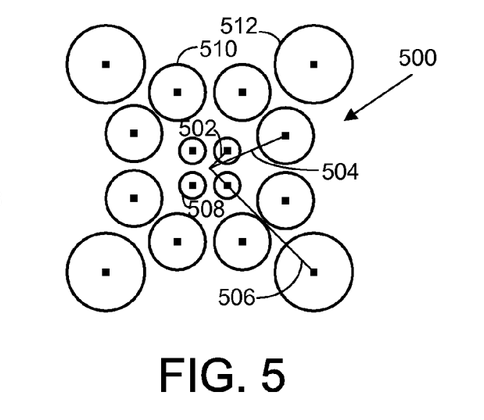
FIG. 5 is a diagram illustrating one embodiment of a pooling point pattern for a 4×4 array, including the local pooling regions surrounding each point.
Figure 6:
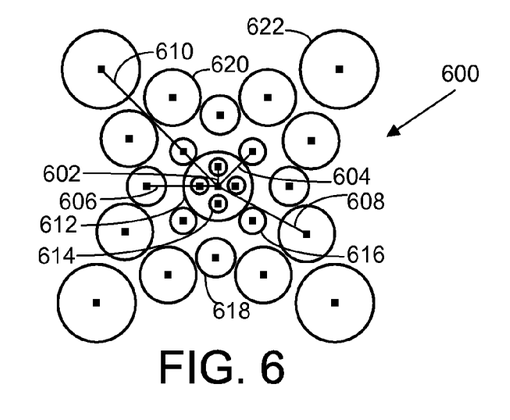
FIG. 6 is a diagram illustrating one embodiment of a pooling point pattern for a 5×5 array, including the local pooling regions surrounding each point.
Figure 7:
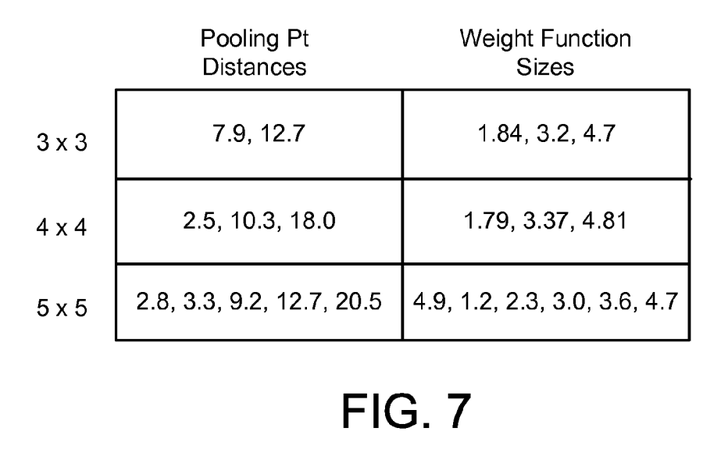
FIG. 7 is a table listing possible pooling point distance and Gaussian weighting function size parameters for the 3×3, 4×4 and 5×5 arrays having the configuration shown in FIGS. 4-6, respectively.

The size of the normalized Gaussian weighting functions defines the local pooling region and it was found better results were obtained if they increased with the distance from a central location in the pooling point pattern. Thus, the weighting functions can vary from pooling point-to-pooling point. It was also found that better results were obtained if any overlap between the extents of the Gaussian weighting functions was kept at a minimum. Additionally, the pooling points need not be equidistant from each other. In fact, it was found that better results were obtained if the pooling points were spread out into a more polar arrangement, where groups of the points fall on concentric circles of increasing radii from a central location of the array. FIG. 4 illustrates one embodiment of the foregoing pooling pattern criteria on a 3×3 array 400. Notice that the orthogonally adjacent pooling points 404 to the point 402 at the central location of the array 400 are all at a distance from the central location such they fall on the same circle 406 (which is concentric with the central location). The same is true of the pooling points 408 that are diagonally adjacent to the point 402 at the central location of the array, except they fall on a concentric circle 410 having a larger radius that the inner concentric circle 406. Also note that the Gaussian weighting functions representing the local pooling regions increase in size the farther the associated pooling point is away from the central location of the array 400. Thus, there are two different prescribed pooling point distance parameters defining the distance of the outer pooling points from the central location of the array. In addition, there are three differently sized Gaussians prescribed. The smallest 412 is associated with the pooling point 402 at the central location of the array, the second size 414 is associated with the orthogonally located pooling points 404, and the third size 416 with the diagonally located pooling points 408. FIGS. 5 and 6 show embodiments of similar array configurations for 4×4 and 5×5 arrays, respectively. In the case of the 4×4 array 500, there are three prescribed pooling point distance parameters 502, 504, 506 and three prescribed Gaussian weighting function sizes 508, 510, 512. In the case of the 5×5 array 600, there are five prescribed pooling point distance parameters 602, 604, 606, 608, 610 and six prescribed Gaussian weighting function sizes 612, 614, 616, 618, 620, 622. FIG. 7 is a table listing the prescribed pooling point distance parameters and prescribed Gaussian weighting function sizes for each of the 3×3, 4×4 and 5×5 arrays having the configuration shown in FIGS. 4-6, respectively, as employed in tested embodiments of the present technique.

2.2.3.2 Polar Arrangement of Pooling Points

In this embodiment of the spatial pooling stage, the aforementioned normalized Gaussian weighting functions are used to sum transformation vectors over local pooling regions in a polar arrangement. The polar arrangement involves a central pooling point surrounded by one or more rings of equally spaced pooling points. Each ring is located at a prescribed radial distance from the central pooling point. In addition, the number of pooling points associated with each ring is prescribed and can vary from ring-to-ring. Still further, the rotational angle of the rings to one another in configurations having more than one ring is prescribed. As with the array configuration, the size of the normalized Gaussian weighting functions defines the local pooling region and it was found better results were obtained if they increased with the distance from a center pooling point. As such, the weighting functions can vary from pooling point-to-pooling point. As before, it was also found that better results were obtained if any overlap between the extents of the Gaussian weighting functions was kept at a minimum.

Figure 8:
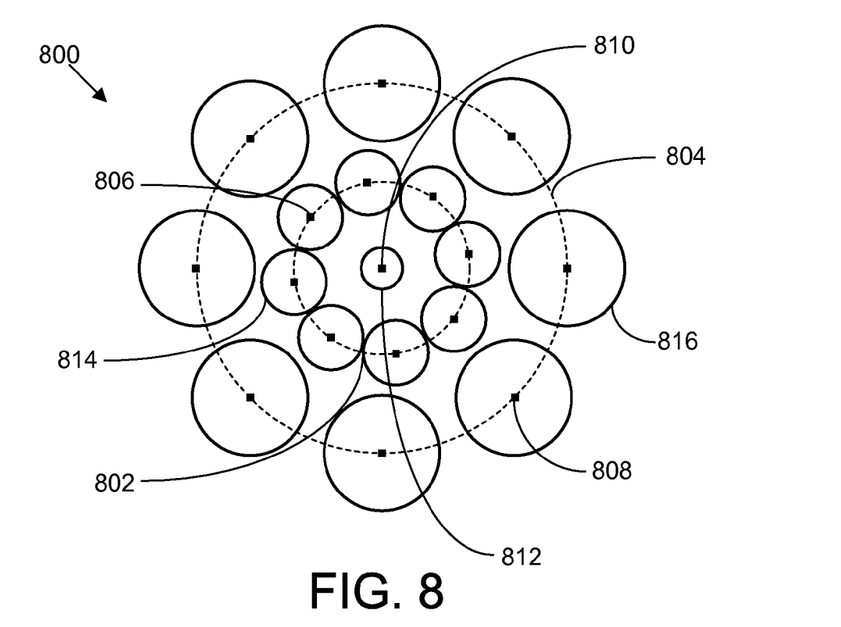
FIG. 8 is a diagram illustrating one embodiment of a pooling point pattern for a polar arrangement having a central pooling point surrounded by two rings of eight pooling points each, including the local pooling regions surrounding each point.
Figure 9:
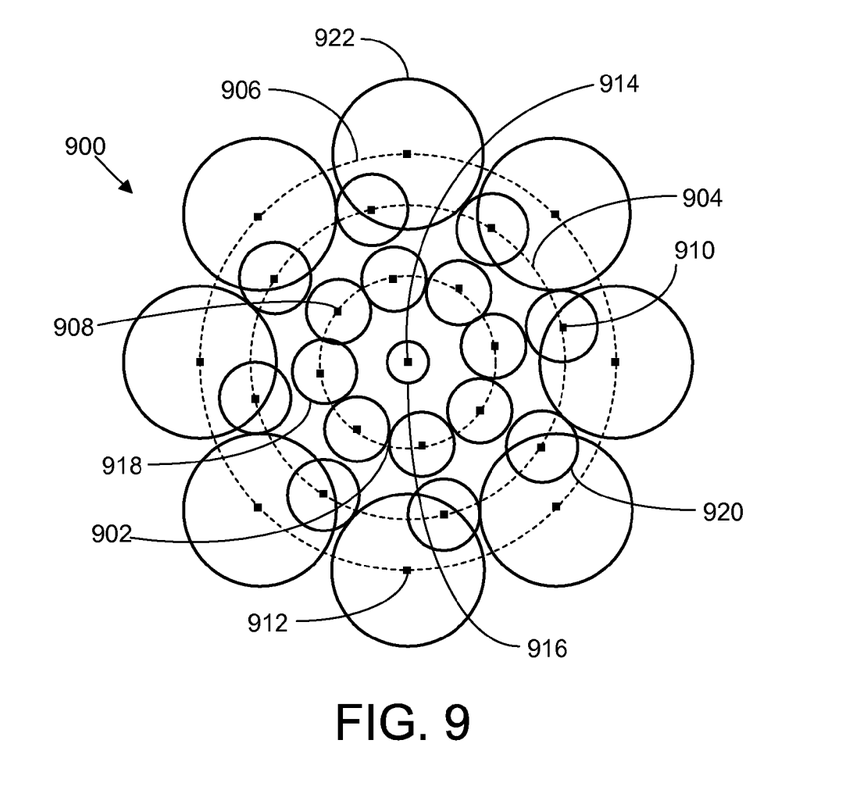
FIG. 9 is a diagram illustrating one embodiment of a pooling point pattern for a polar arrangement having a central pooling point surrounded by three rings of eight pooling points each, including the local pooling regions surrounding each point.
Figure 10:
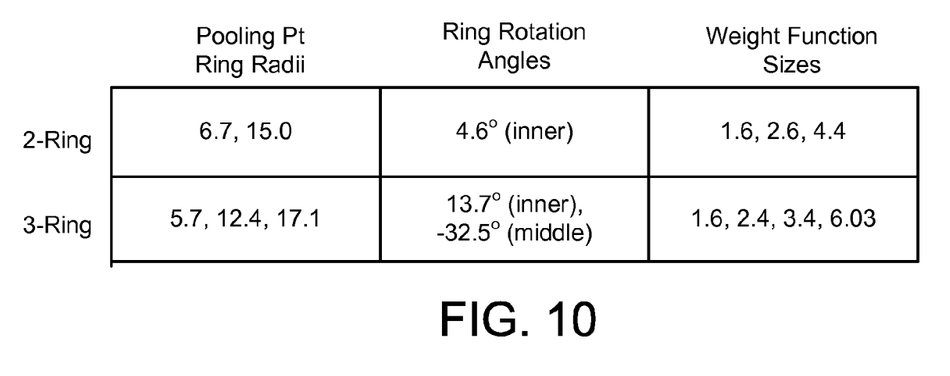
FIG. 10 is a table listing possible pooling point ring radii, rotational angles and Gaussian weighting function size parameters for the two and three ring configurations shown in FIGS. 8 and 9, respectively.

In tested embodiments, two different polar arrangements were employed with good results. In the first, a central pooling point was surrounded by two rings of eight pooling points each (for a total of 17 pooling points). In the second arrangement, a central pooling point was surrounded by three rings of eight pooling points each (for a total of 25 pooling points). FIG. 8 illustrates the first polar arrangement 800. Notice that the size of the Gaussian weighting function increases the farther the associated pooling point is away from the center point. In this case, there are two ring radii defining the distance that each ring 802, 804 of pooling points 806, 808 is from the center pooling point 810. In addition, there are three differently sized Gaussians prescribed. The smallest 812 is associated with the pooling point 810 at the center; the second size 814 is associated with the first ring 802 of pooling points 806; and the third size 816 with the second ring 804 of pooling points 808. FIG. 9 shows the polar arrangement 900 for the aforementioned three ring configuration. Here, there are three prescribed radii and four prescribed Gaussian weighting function sizes. More particularly, there are three ring radii defining the distance that each ring 902, 904, 906 of pooling points 908, 910, 912 is from the center pooling point 914. In addition, there are four differently sized Gaussians prescribed. The smallest 916 is associated with the pooling point 914 at the center; the second size 918 is associated with the first ring 902 of pooling points 908; the third size 920 with the second ring 904 of pooling points 910; and the fourth size 922 with the third ring 906 of pooling points 912. FIG. 10 is a table listing the prescribed pooling point ring radii, rotational angle of the rings, and prescribed Gaussian weighting function sizes for each of the two and three ring configurations shown in FIGS. 8 and 9, respectively, as employed in tested embodiments of the present technique.

2.2.4 Normalization

Figure 11:
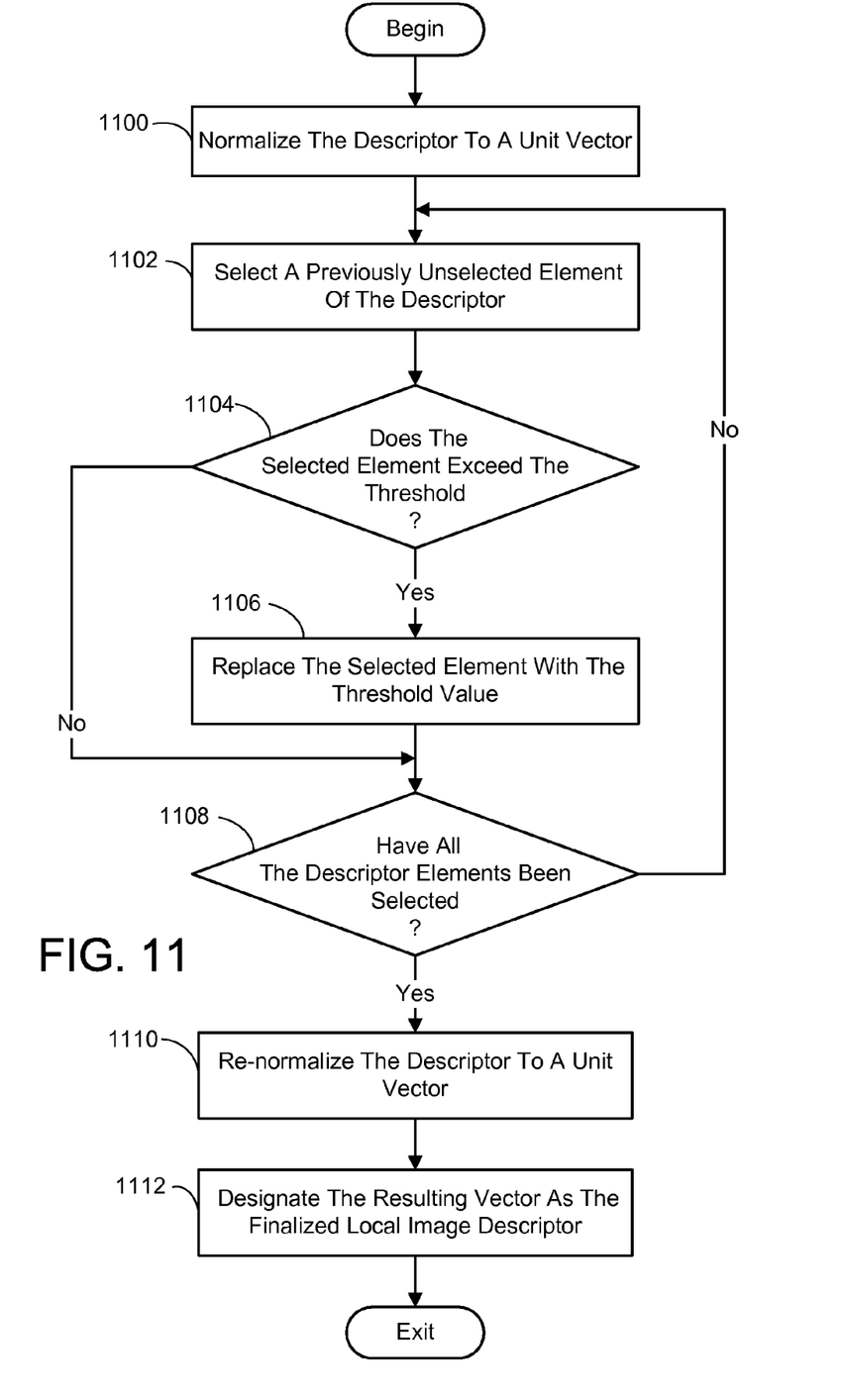
FIG. 11 is a flow diagram generally outlining one embodiment of a process for normalizing the raw local image descriptor existing after the spatial pooling phase of the present technique, to produce a finalized descriptor.

In the normalization phase, the descriptor produced from the spatial pooling phase is normalization to remove its dependency on image contrast by reducing the dynamic range of the descriptor. While, any appropriate normalization procedure can be employed, a range clipping technique was used in tested embodiments. This technique involves range clipping the descriptor elements, as shown in FIG. 11. First, the descriptor is normalized to a unit vector (1100). Next, a previously unselected element of the descriptor is selected (1102). It is then determined if the selected element exceeds a prescribed threshold value (1104). If so, the selected element is replaced with the threshold value (1106). If not, the selected element is left as is. This clipping procedure can be accomplished mathematically by computing:

$$v'_i = \min(v_i, \kappa)$$

where $v_i$ is the $i^{th}$ descriptor element as output from the spatial pooling phase, $\kappa$ is the aforementioned prescribed threshold value, and $v'_i$ is the $i^{th}$ descriptor element of the clipped descriptor. The prescribed clipping threshold value can range between $1/\sqrt{kN}$ and 1.

It is next determined if all the descriptor elements have been selected and processed (1108). If not, actions 1102 through 1108 are repeated. Once all the descriptor elements have been processed, the resulting clipped descriptor is re-normalize to a unit vector (1110). The resulting vector is then designated as the finalized local image descriptor for the image patch (1112).

2.2.5 Local Image Descriptor Generation Process Flow

Figure 12A:
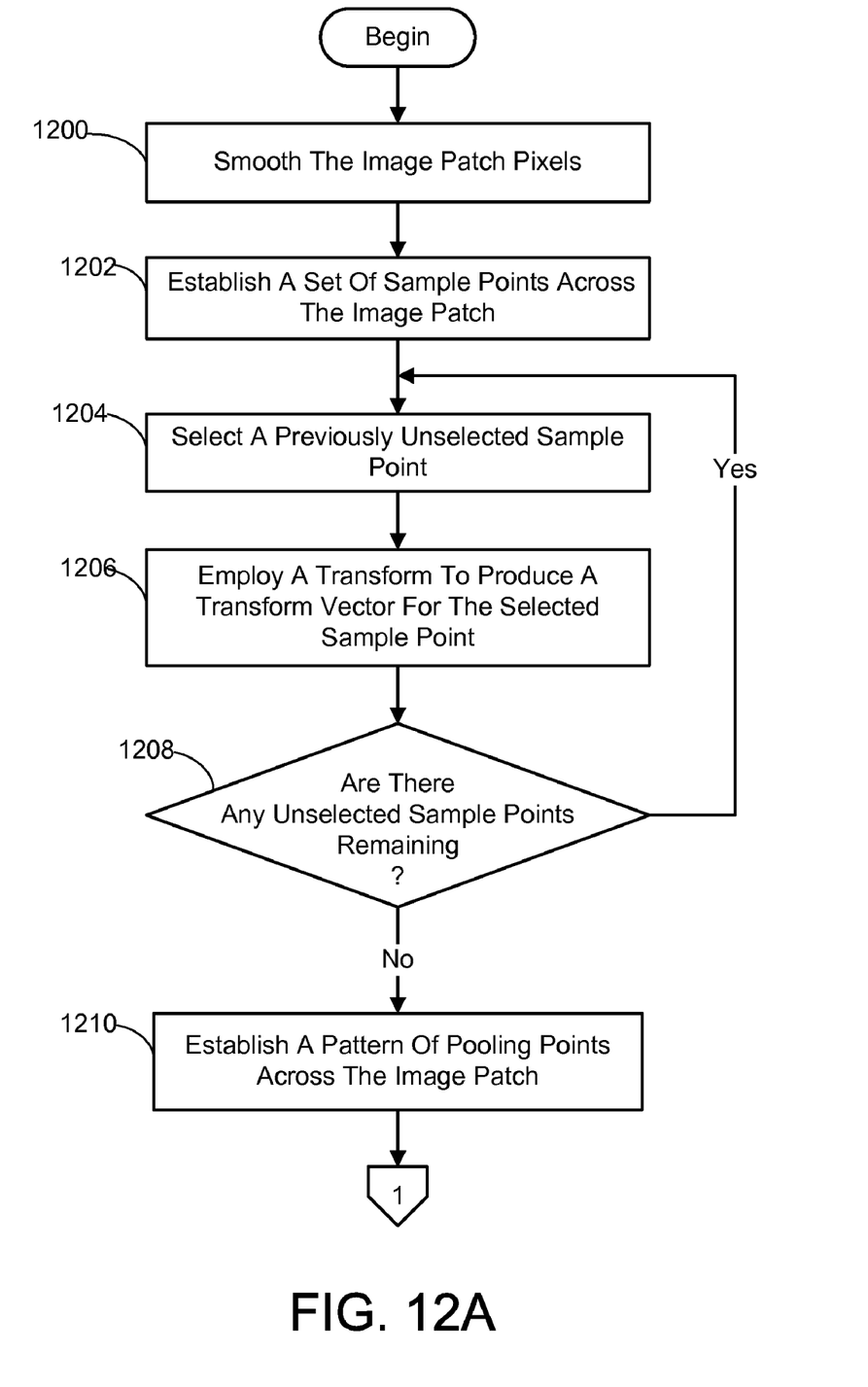
FIGS. 12A-C depict a continuing flow diagram generally outlining one embodiment of a process for generating a local image descriptor according to the present technique.
Figure 12B:
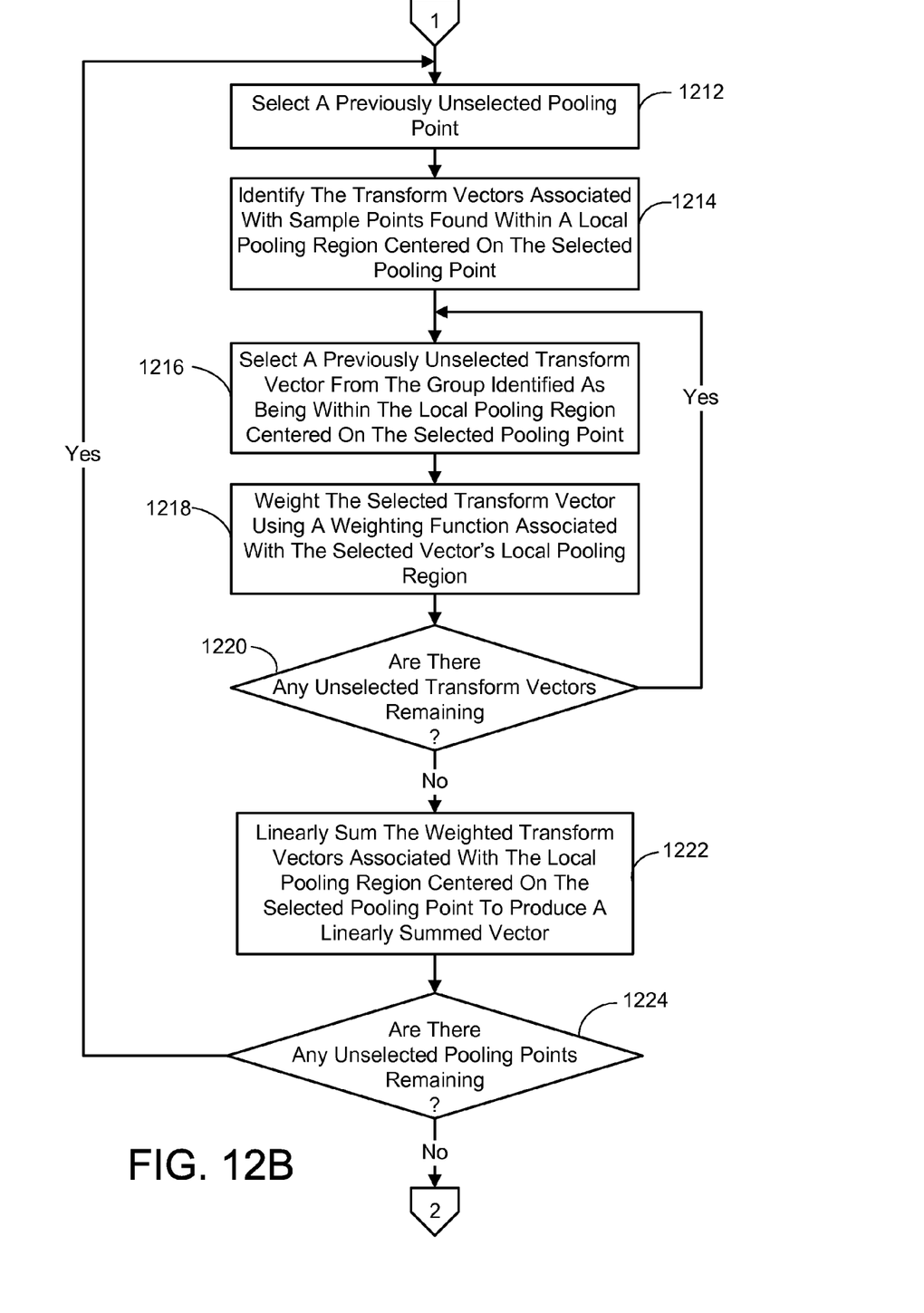
Figure 12C:
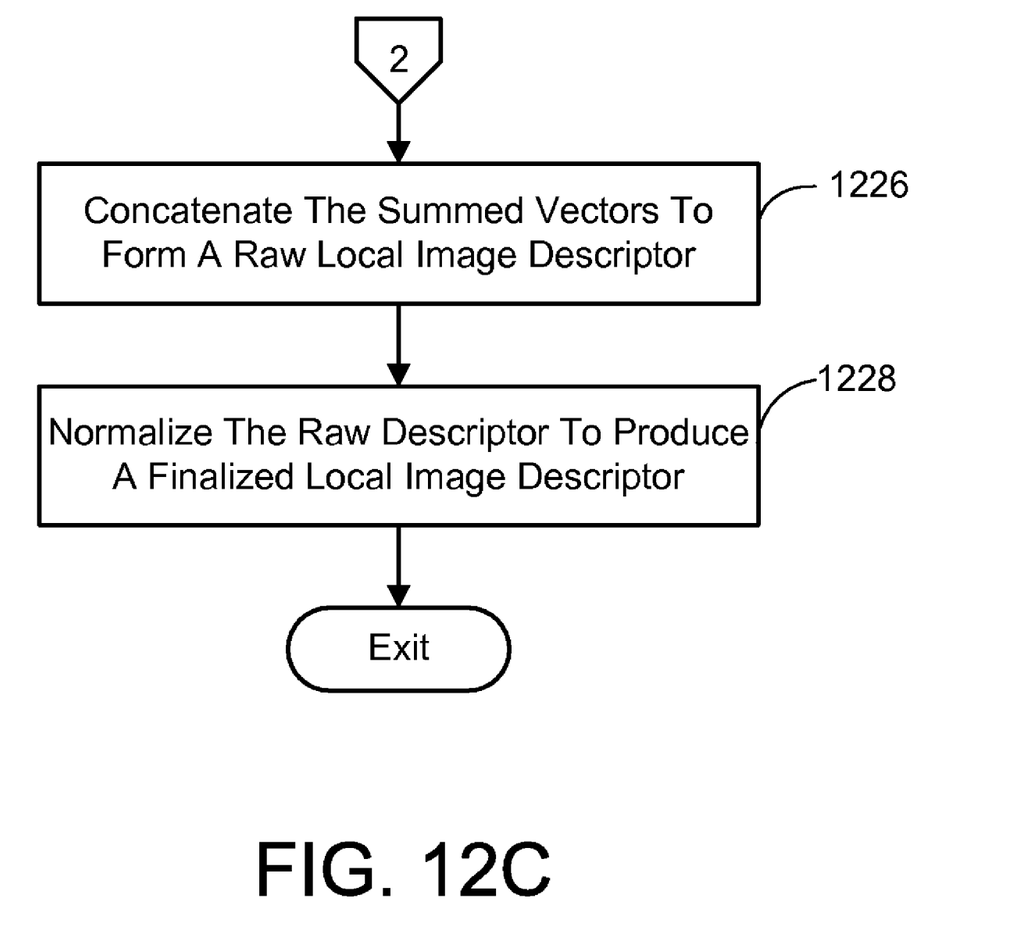

The individual modules in the present local image descriptor generation technique have been described in the foregoing sections. This section describes one embodiment of a process flow for putting these modules together to produce a finalized descriptor from an image patch. Referring to FIGS. 12A-C, the process begins with the pixels of the image patch being smoothed (1200). As indicated previously in one embodiment this is accomplished by convolving the pixels of the image patch with a Gaussian kernel having a prescribed standard deviation. A set of sample points is then established across the image patch (1202). A previously unselected sample point is selected (1204), and a transformation is employed to produce a transform vector for the selected sample point (1206). As described previously, each transform vector has a prescribed number "k" of elements and numerically represents the smoothed values of a pixel or pixels in the vicinity of the selected sample point. It is next determined if there are any sample points that have not been selected and processed (1208). If so, actions 1204 through 1208 are repeated.

A spatial pooling technique is then employed to spatially accumulate weighted versions of the transform vectors. In one embodiment, as shown in FIG. 12A, this involves establishing a pattern of pooling points across the image patch (1210). A previously unselected pooling point is selected (1212), and the transform vectors associated with sample points found within a local pooling region centered on the selected pooling point are identified (1214). A previously unselected transform vector from the group identified as being within the local pooling region centered on the selected pooling point is selected (1216), and the selected transform vector is weighted using a normalized Gaussian weighting function associated with the local pooling region (1218). It is next determined if there are any transform vectors that have not been selected and processed (1220). If so, actions 1216 through 1220 are repeated. If not, the weighted transform vectors created from the group of vectors identified as being within the local pooling region centered on the selected pooling point are linearly summed to produce a linearly summed vector for the selected pooling point (1222). Next, it is determined if there are any pooling points that have not been selected and processed (1224). If so, actions 1212 through 1224 are repeated. Once all the pooling points have been considered, a prescribed number "N" of linearly summed vectors (which equals the number of pooling points), each of which has k elements, will have been produced. These summed vectors are concatenated to form a raw local image descriptor having kN elements (1226). The raw descriptor is then normalized to produce a finalized local image descriptor (1228).

It is noted that in one embodiment of the present technique, the sample points used to produce the transform vectors are the pixels of the image patch.

3.0 Other Embodiments

It should also be noted that any or all of the aforementioned embodiments throughout the description may be used in any combination desired to form additional hybrid embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for generating a local image descriptor for an image patch, comprising using a computer to perform the following process actions:
    smoothing values of pixels of the image patch;
    employing a transformation to produce a transform vector for each of a set of sample points spaced across the image patch, wherein each transform vector produced has a prescribed number of elements k and numerically represents the smoothed values of a pixel or pixels in the vicinity of the sample point associated with the transform vector;
    employing a spatial pooling technique to spatially accumulate weighted versions of the transform vectors to produce N linearly summed vectors each having k elements, which are concatenated to form a raw local image descriptor having kN elements, wherein k and N are integers, and wherein each linearly summed vector is computed by summing the transform vectors associated with sample points found within a local pooling region centered on a pooling point which is part of a pattern of pooling points located across the image patch, and wherein each transform vector used to produce a linearly summed vector is weighted prior to the summing using a normalized Gaussian weighting function associated with the local pooling region of the linearly summed vector; and
    normalizing the raw local image descriptor using a prescribed normalization technique.

2. The process of claim 1, wherein the process action of employing a transformation to produce a transform vector for each of the set of sample points, comprises an action of producing each transform vector so as to have only positive elements.

3. The process of claim 1, wherein the image patch is normalized as to its scale and rotation to match a prescribed canonical scale and rotation, prior to being smoothed.

4. The process of claim 1, wherein the sample points in the set of sample points correspond to the pixel locations of the pixels of the image patch.

5. The process of claim 1, wherein the process action of employing a transformation to produce a transform vector for each sample point of image patch, comprises the actions of:
   computing the gradient vector associated with each sample point of the image patch, wherein each vector comprises x and y gradient elements, wherein gradient elements x and y are numbers; and
   rectifying the x and y gradient elements of each sample point to produce a rectified gradient vector having four, positive elements $|V_x|-V_x$; $|V_x|+V_x$; $|V_y|-V_y$; $|V_y|+V_y$ representing a natural sine-weighted quantization of gradient orientation in four directions.

6. The process of claim 5, wherein the process action of employing a transformation to produce a transform vector for each sample point of image patch, further comprises an action of extending the rectified gradient vector to eight positive elements by concatenating the original four direction gradient vector with an additional four element gradient vector representing a 45 degree rotation of the original four direction gradient vector.

7. The process of claim 1, wherein the process action of employing a transformation to produce a transform vector for each sample point of image patch, comprises the actions of:
   applying steerable filters at each sample point using d orientations to produce d quadrature response pairs for each sample point, wherein each quadrature response pair comprises odd and even components;
   for each sample point, rectifying the odd and even components of each quadrature response pair to produce the vector elements $|even|-even$; $|even|+even$; $|odd|-odd$; $|odd|+odd$ for each pair, thereby generating a rectified quadrature response pair vector for each sample point having k=4d positive vector elements.

8. The process of claim 7, wherein the process action of applying steerable filters at each sample point, comprises using one of second derivative of Gaussian steerable filters or fourth derivative of Gaussian steerable filters.

9. The process of claim 1, wherein the process action of smoothing values of pixels of the image patch, comprises an action of smoothing the pixel values using a Gaussian kernel of a prescribed standard deviation.

10. The process of claim 9, wherein the process action of employing a transformation to produce a transform vector for each sample point of image patch, comprises the actions of:
   computing for each sample point of the image patch, isotropic Difference of Gaussians (DoG) response A and isotropic DoG response B, employing different center scales by convolving the smoothed image patch with three additional Gaussian kernels, respectively; and
   rectifying the A and B DoG responses of each sample point to produce a rectified DoG vector having four, positive elements $|A|-A$; $|A|+A$; $|B|-B$; $|B|+B$ for each sample point.

11. The process of claim 10, wherein the process action of computing DoG responses A and B, comprises the actions of:
   convolving the smoothed image patch, which was smoothed using a Gaussian kernel having a prescribed standard deviation $\sigma_1$, with the first of the three additional Gaussian kernels having a standard deviation $\sigma_2$ which is computed as $\sqrt{(R\sigma_1)^2-\sigma_1^2}$ where R is a prescribed ratio;
   combining the negative of the result of the first convolution with the smoothed image patch to produce the DoG response A;
   convolving the smoothed image patch a second time with the second of the three additional Gaussian kernels having a prescribed standard deviation $\sigma_3$;
   convolving the smoothed image patch a third time with the third of the three additional Gaussian kernels having a standard deviation $\sigma_4$ which is computed as $\sqrt{R^2\sigma_1^2+R^2\sigma_3^2-\sigma_1^2}$; and
   combining the negative of the result of the third convolution with the result of the second convolution to produce the DoG response B.

12. The process of claim 11, wherein the prescribed standard deviation $\sigma_3$ of the second of the three additional Gaussian kernels ranges between about 0.5 and 3.0, and wherein the prescribed ratio R is 1.4.

13. The process of claim 1, wherein the process action of employing a spatial pooling technique to spatially accumulate weighted versions of the transform vectors, comprises the actions of:
   employing a n×n array of pooling points as the pattern of pooling points located across the image patch, wherein n is an integer, and wherein the distance of each outer pooling point from a central location of the array is prescribed and can vary from point-to-point; and
   employing a normalized Gaussian weighting function for each local pooling region which is of a prescribed size and which can vary from pooling region-to-pooling region.

14. The process of claim 13, wherein the size of each normalized Gaussian weighting function increases with the distance of its associated local pooling region from the central location of the array, and wherein the overlap of the normalized Gaussian weighting functions is minimized.

15. The process of claim 14, wherein said n×n array of pooling points comprises one of (i) a 3×3 array, (ii) a 4×4 array, or (iii) a 5×5 array.

16. The process of claim 1, wherein the process action of employing a spatial pooling technique to spatially accumulate weighted versions of the transform vectors, comprises the actions of:
   employing a polar arrangement of pooling points as the pattern of pooling points located across the image patch, said polar arrangement comprising a central pooling point surrounded by one or more rings of equally spaced pooling points, each ring of which is located at a prescribed radial distance from the central pooling point, and wherein the number of pooling points associated with each ring is prescribed and can vary from ring-to-ring; and
   employing a normalized Gaussian weighting function for each local pooling region which is of a prescribed size and which can vary from pooling region-to-pooling region.

17. The process of claim 16, wherein the size of each normalized Gaussian weighting function increases with the distance of its associated local pooling region from the central pooling point, and wherein the overlap of the normalized Gaussian weighting functions is minimized.

18. The process of claim 17, wherein said polar arrangement comprises one of (i) a central pooling point surrounded by two rings of eight pooling points each, or (ii) a central pooling point surrounded by three rings of eight pooling points each.

19. A computer-implemented process for generating a local image descriptor for an image patch, comprising using a computer to perform the following process actions:

smoothing the image patch, said smoothing comprising convolving the pixels of the image patch with a Gaussian kernel having a prescribed standard deviation;

employing a transformation to produce a transform vector for each pixel of the image patch, wherein each transform vector produced has a prescribed number of elements k;

spatially accumulating weighted versions of the transform vectors to produce N linearly summed vectors each having k elements, which are concatenated to form a raw local image descriptor having kN elements, wherein k and N are integers, and wherein each linearly summed vector is computed by summing the transform vectors associated with pixels located within a local pooling region centered on a pooling point which is part of a pattern of pooling points located across the image patch, and wherein each transform vector used to produce a linearly summed vector is weighted prior to the summing using a normalized Gaussian weighting function associated with the local pooling region of the linearly summed vector;

normalizing the raw local image descriptor to produce a finalized local image descriptor for the image patch.

20. A system for generating a local image descriptor for an image patch, comprising:

a general purpose computing device; and a computer program comprising program modules executable by the computing device, wherein the computing device is directed by the program modules of the computer program to, smooth values of pixels of the image patch using a Gaussian kernel having a prescribed standard deviation, produce a transform vector for each of a set of sample points spaced across the image patch, wherein each transform vector produced has a prescribed number of elements k and represents the smoothed values of a pixel or pixels in the vicinity of the sample point associated with the transform vector, spatially accumulate weighted versions of the transform vectors to produce N linearly summed vectors each having k elements, which are concatenated to form a raw local image descriptor having kN elements, wherein k and N are integers, and wherein each linearly summed vector is computed by summing the transform vectors associated with sample points found within a local pooling region centered on a pooling point which is part of a pattern of pooling points located across the image patch, and wherein each transform vector used to produce a linearly summed vector is weighted prior to the summing using a normalized Gaussian weighting function associated with the local pooling region of the linearly summed vector, normalize the raw local image descriptor to a unit vector, clip all descriptor elements that exceed a prescribed threshold to the value of the threshold, and re-normalize the clipped descriptor to a unit vector to produce a finalized local image descriptor for the image patch.

* * * * *